Sept. 7, 1926.

E. A. ASHCROFT 1,599,269

TREATMENT OF LEAD ZINC SULPHIDE ORES, MATTES, AND THE LIKE

Original Filed June 28, 1923    2 Sheets-Sheet 1

Sept. 7, 1926.  
E. A. ASHCROFT  
1,599,269  
TREATMENT OF LEAD ZINC SULPHIDE ORES, MATTES, AND THE LIKE  
Original Filed June 28, 1923  2 Sheets-Sheet 2

INVENTOR  
EDGAR A. ASHCROFT  
BY  
ATTORNEYS

Patented Sept. 7, 1926.

1,599,269

UNITED STATES PATENT OFFICE.

EDGAR ARTHUR ASHCROFT, OF LONDON, ENGLAND.

TREATMENT OF LEAD-ZINC SULPHIDE ORES, MATTES, AND THE LIKE.

Application filed June 28, 1923, Serial No. 648,333, and in Great Britain June 2, 1923. Renewed May 11, 1926.

My invention consists in improvements in the treatment of lead-zinc sulphide ores, concentrates, mattes, and like metalliferous sulphide materials containing lead in substantial proportion along with zinc, iron and minor proportions of other metals, which, when chlorinated and treated as hereinafter set forth, yield a melt of lead chloride suitable for electrolysis.

Figure 1:
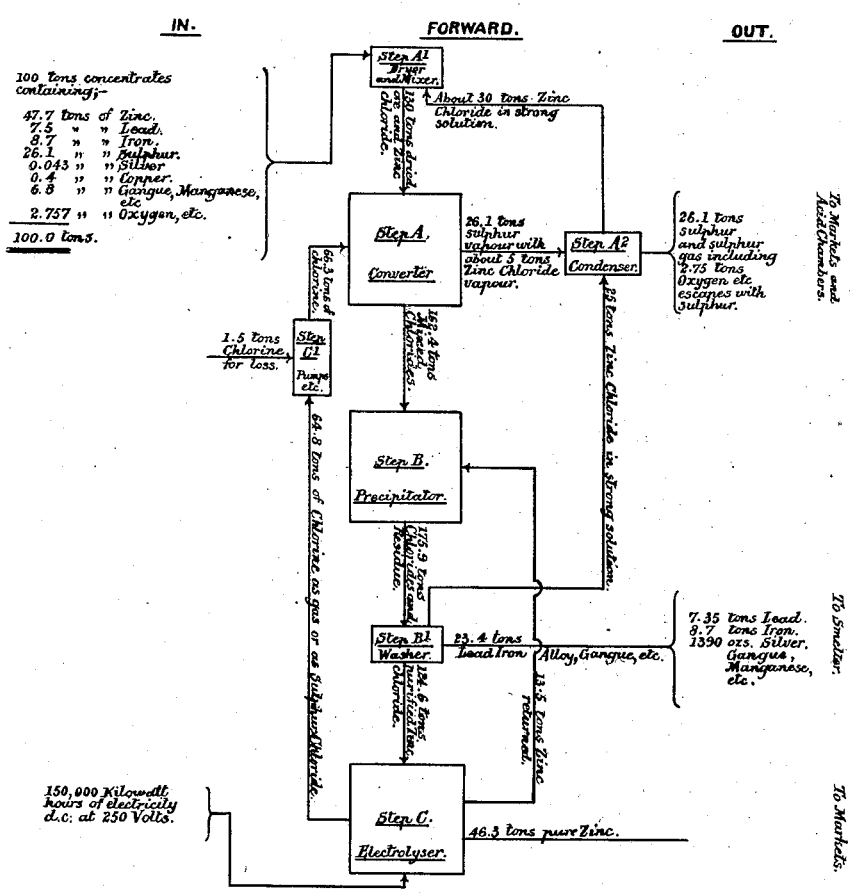

Figure 1 of the accompanying diagrams illustrates, in the form of a flow sheet, a method of treating metalliferous sulphide materials involving the decantation of fused zinc chloride from the lead-iron precipitate therein referred to. The present invention is more particularly suitable for the treatment of materials in which the lead predominates over the zinc to such an extent that the decantation of fused chloride from the lead-iron precipitate would offer difficulties, or be impracticable, but it may also be applied to materials in which the lead, though in substantial proportion, does not predominate over the zinc to this extent or at all.

According to my invention the raw metalliferous material is first chlorinated which can for instance be done by means of chlorine, or chloride of sulphur, at a temperature of about 600° to 700° centigrade, in any known or suitable manner, the sulphur expelled being readily condensed and recovered. The mixture of metallic chlorides produced is treated in the cold with a concentrated aqueous solution of zinc chloride, to extract the soluble chlorides from the lead chloride, which latter including any silver chloride and minor constituents present, is then electrolyzed in the fused state for the recovery of the metal, or metals, therefrom, the chlorine evolved being recovered for re-use. Preferably the electrolysis is effected in a multiple-couple electrolyzer of the type described in the specifications of my co-pending applications for Letters Patent Serial Nos. 551,306 of 10 April, 1922, and 637,245 of 7 May, 1923.

In a preferred mode of preforming the invention the chlorine liberated during the electrolysis of the lead chloride is employed cyclically in the chlorination of further quantities of raw material, and the gaseous sulphur expelled from the raw material during the chlorination is condensed upon the surface of a strong aqueous solution of crude zinc chloride, the solution of zinc and iron chlorides extracted from the mixture of metallic chlorides being used for this purpose. Any metallic chloride (notably zinc chloride) distilled over along with the sulphur dissolves in the solution, while the condensed sulphur is retained as a floating layer and is recovered at intervals or continuously. From time to time portions of the concentrated solution accumulating in the condenser are withdrawn and utilized in any desired manner. They may advantageously be mixed with zinc concentrates, or the like, and worked up therewith, as illustrated in Figure 1 of the diagram aforesaid, in a separate plant. In this manner the iron is eventually separated in the form of the lead-iron precipitate aforesaid and the zinc and chlorine are recovered by electrolysis.

The electrolysis of the fused lead chloride may be effected in one operation, or fractionally as preferred. In the latter case the first "cut" (or fractionation) may be made when the silver alloyed with a little lead has been deposited, and thereafter, lead of a high degree of purity can be thrown down.

It is preferred to operate at a temperature of from about 400° to about 450° centigrade, in all stages of the process, after the chlorination, where molten chlorides are under treatment, as it is found that the melts, while remaining sufficiently fluid at this temperature, do not emit fumes when exposed to the atmosphere; they can be manipulated freely and do not attack iron, or steel. Under these conditions, therefore, vessels and agitators made of iron and steel are durable in the process, and the melts do not become contaminated.

Example.

Figure 2:
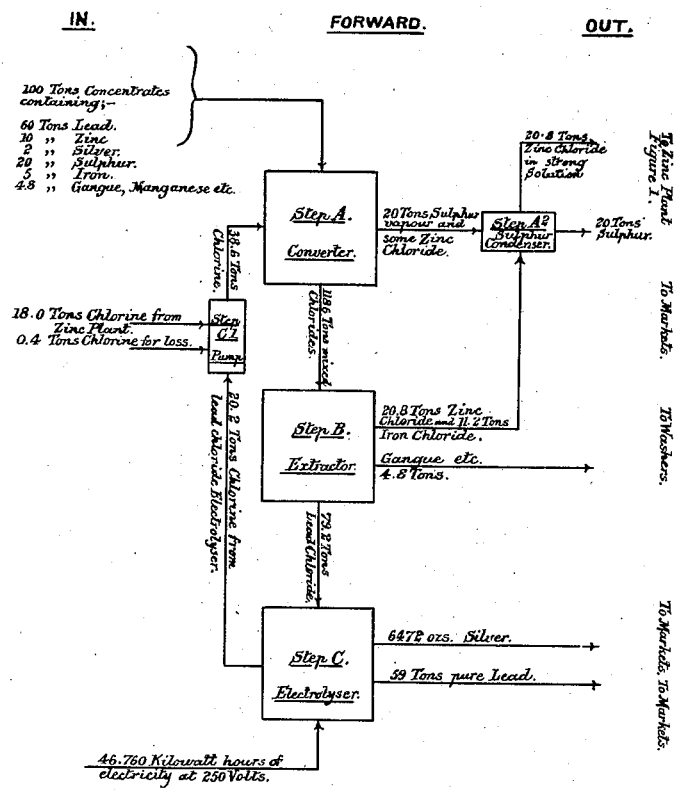

Figure 2 of the accompanying diagrams exemplifies the application of my present invention to the treatment of the commercial product known as "lead concentrates", of which a typical analysis is as follows:— lead 60; zinc 10; iron 5; sulphur 20 and silver 2 per cent, the remainder being gangue and the like.

This raw material is chlorinated by means of chlorine in a converter at about 600° to 700° centigrade in known manner. The sulphur expelled is condensed upon the surface of a strong solution of crude zinc chloride having a specific gravity of about 2.2 and maintained at a temperature of about 130° centigrade. The condensed sulphur is removed at intervals or continuously. The molten mixture of metallic chlorides is poured from the converter, disintegrated, and treated cold with a limited quantity of cold water, or zinc chloride solution, to extract the zinc and iron chlorides. It is preferable to conduct the extraction systematically by treating the disintegrated melt first with strong crude zinc chloride solution, then with weaker solution, and finally with water, the wash liquors being used in the treatment of further batches of disintegrated melt and progressively strengthened to a degree at which the solution is suitable for transference to the sulphur condenser. Portions of the more concentrated solution of zinc and iron chlorides are withdrawn from the condenser at intervals and worked up for the recovery of the zinc therein. It is preferred to transfer them to a separate plant in which zinc concentrates are under treatment and to work them up with the said concentrates as indicated in Figure 1 of the aforesaid diagrams. The lead chloride (including silver chloride and minor impurities) remaining after the extraction, is then fused and electrolyzed in two cuts as hereinbefore mentioned, preferably in a multiple-couple electrolyzer, the chlorine liberated being used over again in chlorinating lead concentrates.

The proportion of iron, copper and other minor constituents in the melt introduced into the electrolyzer should preferably not exceed about 0.1 per cent of each.

It has been found that manganese chloride, when present in the melt to the extent of from one to five per cent exerts a beneficial influence during the electrolysis. If not derived from the materials under treatment, small amounts of manganese may therefore be added in any suitable form and at any suitable stage in the process.

What I claim is:—

1. The method of treating metalliferous materials containing lead in substantial proportions along with other metals, which comprises subjecting the same to chlorination at fusion temperature, extracting water-soluble chlorides from the chilled and solidified chlorination product, and re-fusing and electrolytically decomposing the thus purified product containing lead chloride.

2. The method of treating metalliferous materials containing lead in substantial proportions along with other metals, which comprises subjecting the same to chlorination at fusion temperature, washing the chilled and solidified chlorination product with an aqueous solution of zinc chloride to remove certain soluble chlorides, and re-fusing and electrolytically decomposing the thus purified product containing lead chloride.

3. The method of treating metalliferous sulphide materials containing lead in substantial proportions along with other metals, which comprises subjecting the same to chlorination, washing the chlorination product with an aqueous solution of zinc chloride to remove certain soluble chlorides, and electrolytically decomposing the thus purified product containing lead chloride, the sulphur driven off during the chlorination step being condensed upon an aqueous solution of zinc chloride.

4. The method of treating metalliferous sulphide materials containing lead in substantial proportions along with other metals, which comprises subjecting the same to chlorination, washing the chlorination product with an aqueous solution of zinc chloride to remove certain soluble chlorides, and electrolytically decomposing the thus purified product containing lead chloride, the sulphur driven off during the chlorination step being condensed upon an aqueous solution of zinc chloride, and the zinc chlorides being separated from the sulphur for the recovery of zinc therefrom.

5. The method of treating lead-zinc sulphides containing minor quantities of other metals, which comprises subjecting the same to chlorination, washing the resulting chlorides when cold with an aqueous solution of zinc chloride, and subjecting the purified lead chloride to electrolysis.

6. The process of treating lead-zinc sulphides containing minor quantities of silver, which comprises subjecting the sulphides to chlorination, washing the resulting chlorides when cold with an aqueous solution of zinc chloride, and subjecting the purified lead chloride to fractional electrolysis to recover by preliminary fractionation a silver-lead alloy, and by a succeeding fractionation pure lead.

7. The process of treating metalliferous lead-zinc chlorides, which comprises subjecting the same to chlorination in fused condition, extracting soluble chlorides from the resulting chlorides when cold by washing with a solvent liquor, and subjecting the purified lead chloride to electrolytic decomposition in the presence of from 1 to 5% of manganese chloride.

8. In a process in accordance with claim 2, condensing the sulphur expelled during chlorination, upon the surface of a concentrated aqueous solution of soluble chlorides extracted from the mixture of metallic chlorides and electrolyzing the remaining insoluble chloride at a temperature of from about 400° to about 450° centigrade.

9. In a process in accordance with claim 2, condensing the sulphur expelled during chlorination, upon the surface of a concentrated aqueous solution of soluble chlorides extracted from the mixture of metallic chlorides and electrolyzing the remaining insoluble chloride at a temperature of from about 400° to about 450° centigrade, the chlorine liberated being used cyclically in the chlorination of further batches of metalliferous material, substantially as hereinbefore described.

10. In a process in accordance with claim 2, the step of mixing portions of the aqueous solution of zinc and iron chlorides from time to time, with zinc concentrates, or the like, and working up the latter to separate the iron and recover the zinc and chlorine.

11. The method of treating metalliferous materials containing lead in substantial proportions along with other metals, which comprises subjecting the same to chlorination, extracting water-soluble chlorides from the chlorination product, and subjecting the thus purified product to fractional electrolytic decomposition.

12. The method of treating metalliferous sulphides containing lead in substantial proportions along with zinc and minor quantities of iron, which comprises chlorinating the material at from about 600° to 700° C., condensing and recovering the sulphur expelled, extracting zinc and iron chlorides from the resulting mixture of metallic chlorides in the cold by means of a cold aqueous solvent, electrolyzing the remaining chloride in the fused state and recovering the metals and chlorine liberated therefrom.

In testimony whereof I have signed my name to this specification.

EDGAR ARTHUR ASHCROFT.